United States Patent
Hashimoto et al.

(10) Patent No.: US 10,389,288 B2
(45) Date of Patent: Aug. 20, 2019

(54) MOTOR CONTROLLER

(71) Applicant: FANUC CORPORATION, Minamitsuru-gun, Yamanashi (JP)

(72) Inventors: Shoutarou Hashimoto, Yamanashi (JP); Yuuki Morita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/032,326

(22) Filed: Jul. 11, 2018

(65) Prior Publication Data

US 2019/0036467 A1   Jan. 31, 2019

(30) Foreign Application Priority Data

Jul. 28, 2017 (JP) .................................. 2017-146986

(51) Int. Cl.
| H02P 21/18 | (2016.01) |
| H02P 21/09 | (2016.01) |
| H02P 25/062 | (2016.01) |

(52) U.S. Cl.
CPC .............. *H02P 21/18* (2016.02); *H02P 21/09* (2016.02); *H02P 25/062* (2016.02); *H02P 2203/07* (2013.01)

(58) Field of Classification Search
CPC .......... H02P 1/04; H02P 23/03; H02P 25/092; H02P 23/14; H02P 25/08
See application file for complete search history.

(56) References Cited

U.S. PATENT DOCUMENTS

| 6,831,439 B2* | 12/2004 | Won .................. H02P 21/00 318/700 |
| 6,989,668 B2* | 1/2006 | Mayes .................. H02P 6/18 318/254.1 |

(Continued)

FOREIGN PATENT DOCUMENTS

| JP | 62-124461 | 6/1987 |
| JP | 02-278174 | 11/1990 |

(Continued)

OTHER PUBLICATIONS

Notification of Reasons for Refusal issued May 7, 2019 in corresponding Japanese Patent Application No. 2017-146986.

*Primary Examiner* — Rina I Duda
(74) *Attorney, Agent, or Firm* — Wenderoth, Lind & Ponack, L.L.P.

(57) ABSTRACT

A motor controller includes: a rotation speed estimating unit that estimates a rotation speed of an motor on the basis of current information and primary frequency information of the motor; a proximity switch that outputs an ON signal when a portion of a rotating body of the motor is in proximity and outputs an OFF signal when a portion of the rotating body of the motor is not in proximity; a rotation speed computing unit that computes a rotation speed of the motor on the basis of the ON signal and the OFF signal output from the proximity switch; and an abnormality detection unit that detects an abnormality in the rotation speed estimation value or an abnormality in the proximity switch when a difference between the estimated rotation speed estimation value and the computed rotation speed computation value is equal to or larger than a threshold.

7 Claims, 9 Drawing Sheets

(56) References Cited

U.S. PATENT DOCUMENTS

| | | | | |
|---|---|---|---|---|
| 8,723,462 B2* | 5/2014 | Jang | ............... | G01P 3/481 |
| | | | | 318/280 |
| 2014/0035505 A1* | 2/2014 | Wai | ............... | H02P 23/03 |
| | | | | 318/461 |
| 2014/0336864 A1* | 11/2014 | Yoshida | ............ | B60W 50/0205 |
| | | | | 701/29.2 |

FOREIGN PATENT DOCUMENTS

| | | |
|---|---|---|
| JP | 05-068391 | 3/1993 |
| JP | 2011-211768 | 10/2011 |
| JP | 2013-240194 | 11/2013 |
| JP | 5435252 | 3/2014 |
| WO | 2008/007541 | 1/2008 |

* cited by examiner

MOTOR CONTROLLER

This application is based on and claims the benefit of priority from Japanese Patent Application. No. 2017-146986, filed on 28 Jul. 2017, the content of which is incorporated herein by reference.

BACKGROUND OF THE INVENTION

Field of the Invention

The present invention relates to a motor controller that performs speed sensorless control for a motor.

Related Art

A motor controller that drives and controls a motor such as an induction motor or a synchronous motor is classified into a motor controller that uses a speed sensor such as a rotary encoder or a resolver and a motor controller that performs so-called speed sensorless control and does not use such a speed sensor. Patent Documents 1 and 2 disclose a motor controller that performs speed sensorless control for a motor.

For example, a motor controller disclosed in Patent Document 2 estimates a primary frequency and a slip frequency of a motor from an actual current value (a current FB value) of the motor, estimates a rotation speed of the motor by subtracting a slip frequency estimation value from a primary frequency estimation value, and drives and controls the motor on the basis of this rotation speed estimation value.

Such a motor controller has advantages in a low cost and a small size since the motor controller does not have a speed sensor. Moreover, since wiring for the speed sensor is not necessary, it is possible to enhance water-repellent performance of the motor.

Patent Document 1: Japanese Patent No. 5435252
Patent Document 2: Japanese Unexamined Patent Application, Publication No. 2013-240194

SUMMARY OF THE INVENTION

In a motor controller that performs speed sensorless control for a motor, a rotation speed estimation value may deviate greatly from an actual speed due to limitation of control performance (for example, responsiveness). In such a case, in the motor controller, speed control based on a rotation speed estimation value is not performed properly, and an abnormal operation (for example, an uncontrollable state) may occur.

In this regard, inventors of the present application have proposed a technology of detecting an actual speed using a separate proximity switch (for example, a proximity switch defined by JIS C 8201-5-2 or IEC60947-5-2, the details thereof will be described later) and correcting a primary frequency and/or a slip frequency. However, when an abnormality occurs in a proximity switch, correction is not performed properly and an abnormal operation may occur.

Therefore, it is desirable to detect an abnormality in a rotation speed estimation value and an abnormality in a proximity switch.

An object of the present invention is to provide a motor controller which performs speed sensorless control for a motor and detects an abnormality in a rotation speed estimation value or an abnormality in a proximity switch.

(1) A motor controller (for example, a motor controller 1 to be described later) according to the present invention is a motor controller that performs speed sensorless control for a motor (for example, an induction motor 3 to be described later), including: a rotation speed estimating unit (for example, a rotation speed estimating unit 30 to be described later) that estimates a rotation speed of the motor on the basis of current information and primary frequency information of the motor; a proximity switch (for example, a proximity switch 31 to be described later) that outputs an ON signal when a portion of a rotating body of the motor is in proximity and outputs an OFF signal when a portion of the rotating body of the motor is not in proximity; a rotation speed computing unit (for example, a rotation speed computing unit 32 to be described later) that computes a rotation speed of the motor on the basis of the ON signal and the OFF signal output from the proximity switch; and an abnormality detection unit (for example, an abnormality detection unit 40 to be described later) that detects an abnormality in a rotation speed estimation value or an abnormality in the proximity switch when a difference between the rotation speed estimation value estimated by the rotation speed estimating unit and a rotation speed computation value computed by the rotation speed computing unit is equal to or larger than a threshold.

(2) In the motor controller according to (1), the abnormality detection unit may detect an abnormality in the rotation speed estimation value or an abnormality of the proximity switch when a state in which the difference between the rotation speed estimation value estimated by the rotation speed estimating unit and the rotation speed computation value computed by the rotation speed computing unit is equal to or larger than the threshold continues for a predetermined period or longer.

(3) The motor controller according to (1) or (2) may further include: a delay compensating unit (for example, a delay compensating unit 34 to be described later) that corrects a delay of the rotation speed computation value computed by the rotation speed computing unit with respect to an actual speed or the rotation speed estimation value estimated by the rotation speed estimating unit, and the abnormality detection unit may detect an abnormality in the rotation speed estimation value or an abnormality in the proximity switch when a difference between the rotation speed estimation value estimated by the rotation speed estimating unit and the rotation speed computation value corrected by the delay compensating unit is equal to or larger than a threshold.

(4) In the motor controller according to (3), the rotation speed computing unit may count the number of pulses of the ON signal output from the proximity switch at a predetermined sampling period, convert the counted number of pulses to a speed, and average the converted speed using a filter to thereby obtain the rotation speed computation value, and the delay compensating unit may have an inverse function of a transfer function of the filter of the rotation speed computing unit.

(5) The motor controller according to (1) or (2) may further include: a delay unit that delays the rotation speed estimation value estimated by the rotation speed estimating unit by a delay of the rotation speed computation value computed by the rotation speed computing unit with respect to the actual speed or the rotation speed estimation value estimated by the rotation speed estimating unit, and the abnormality detection unit may detect an abnormality in the rotation speed estimation value or an abnormality in the proximity switch when a difference between the rotation speed estimation value delayed by the delay unit and the rotation speed computation value computed by the rotation speed computing unit is equal to or larger than a threshold.

(6) In the motor controller according to (5), the rotation speed computing unit may count the number of pulses of the ON signal output from the proximity switch at a predetermined sampling period, convert the counted number to a speed, and average the converted speed using a filter to thereby obtain the rotation speed computation value, and the delay unit may have the same filter as the filter of the rotation speed computing unit.

(7) The motor controller according to any one of (1) to (4) may further include: an abnormality notification unit (for example, an abnormality notification unit 42 to be described later) that notifies a host controller of a fact that the abnormality detection unit has detected an abnormality in the rotation speed estimation value or an abnormality in the proximity switch.

According to the present invention, it is possible to provide a motor controller which performs speed sensorless control for a motor and detects an abnormality in a rotation speed estimation value or an abnormality in a proximity switch.

DETAILED DESCRIPTION OF THE INVENTION

Figure 1:
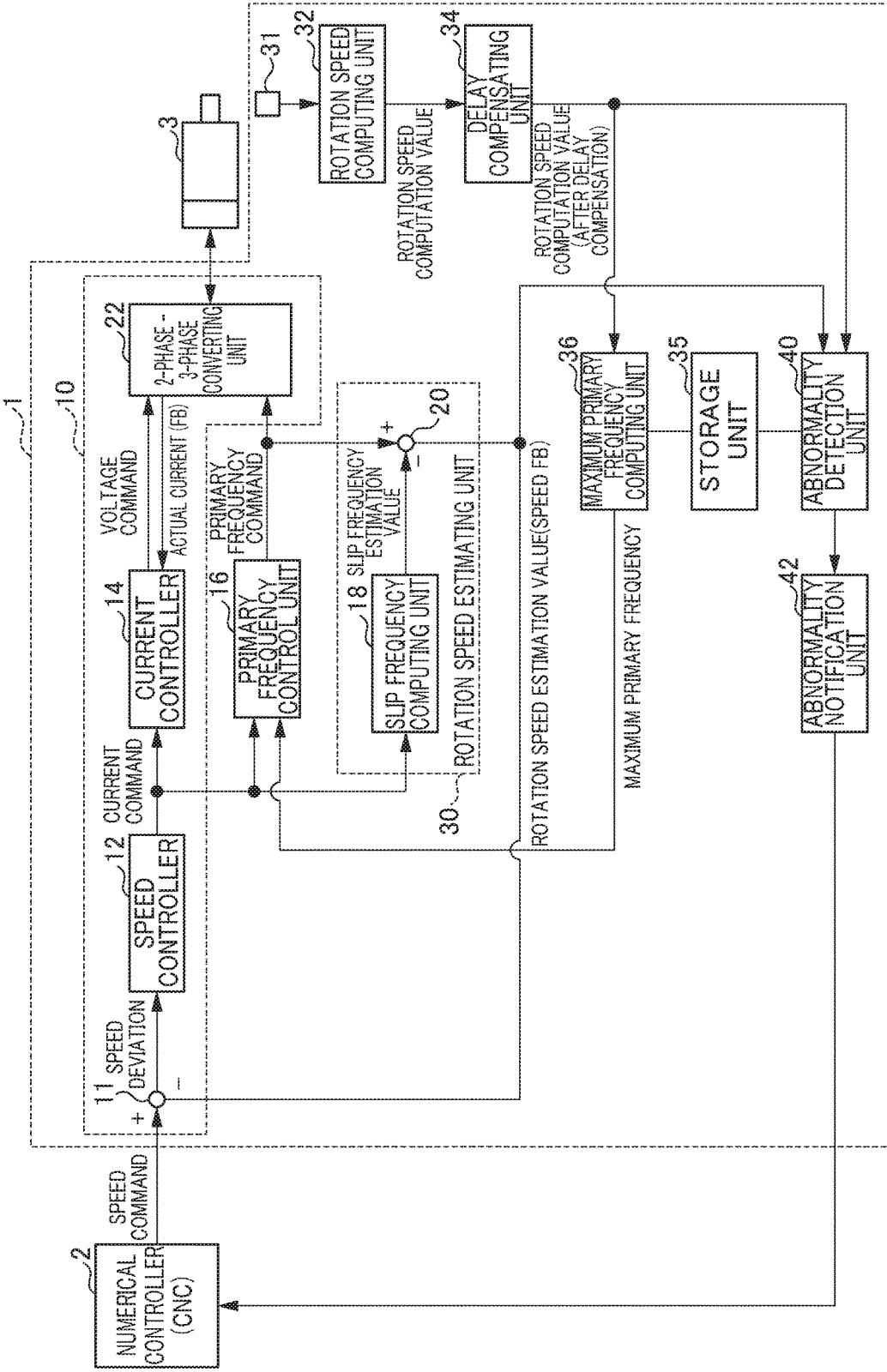
FIG. 1 is a diagram illustrating a configuration of a motor controller according to a first embodiment.

Hereinafter, an example of an embodiment of the present invention will be described with reference to the accompanying drawings. In the respective drawings, the same or corresponding portions will be denoted by the same reference numerals.

First Embodiment

FIG. 1 is a diagram illustrating a configuration of a motor controller according to a first embodiment. A motor controller 1 illustrated in FIG. 1 drives and controls an induction motor 3 according to a speed command which is supplied from a numerical controller (CNC) 2 and is based on a machining program.

The induction motor 3 drives a spindle (a rotating shaft) of a machine tool that performs cutting, for example. The induction motor 3 is so-called a speed sensorless motor that does not have a speed sensor such as a rotary encoder.

The motor controller 1 is a motor controller which performs so-called speed sensorless control which does not use a speed sensor such as a rotary encoder. The motor controller 1 performs vector control of the induction motor 3.

The motor controller 1 includes a subtract 11, a speed controller 12, a current controller 14, a primary frequency control unit 16, a slip frequency computing unit 18, a subtractor 20, a 2-phase-3-phase converting unit 22, a proximity switch 31, a rotation speed computing unit 32, a delay compensating unit 34, a storage unit 35, and a maximum primary frequency computing unit 36. The subtractor 11, the speed controller 12, the current controller 14, and the 2-phase-3-phase converting unit 22 form a speed control system 10. The slip frequency computing unit 18 and the subtractor 20 form a rotation speed estimating unit 30.

The motor controller 1 further includes an abnormality detection unit 40 and an abnormality notification unit 42.

The subtractor 11 obtains a speed deviation between a speed command value supplied from the numerical controller 2 and a rotation speed estimation value (a speed FB) estimated by the rotation speed estimating unit 30 to be described later.

The speed controller 12 performs PI (proportional integral) control, for example, on the speed deviation obtained by the subtractor 11 to generate a current command value (a torque command value).

The current controller 14 generates a voltage command value on the basis of the current command value (a torque command value) generated by the speed controller 12 and an actual current value (a driving current value, a current FB value) of the induction motor 3 detected by a current detector (not illustrated). The current controller 14 performs vector control, for example. Specifically, the current controller 14 generates a d-phase current command value (an excitation current command value) and a q-phase current command value (a torque current command value) from the current command value (the torque command value). The current controller 14 generates a d-phase voltage command value on the basis of a difference between the d-phase current command value and a d-phase actual current value obtained by the 2-phase-3-phase converting unit 22 converting an actual current value of the three UVW phases. Moreover, the current controller 14 generates a q-phase voltage command value on the basis of a difference between the q-phase current command value and a q-phase actual current value obtained by the 2-phase-3-phase converting unit 22 converting an actual current value of the three UVW phases.

The primary frequency control unit 16 obtains a primary frequency command value on the basis of the current command value (the torque command value) generated by the speed controller 12.

Various methods are known as a method for calculating the primary frequency command value. For example, an actual current value (for example, a q-phase actual current value) may be used instead of the current command value, and a current deviation between the current command value (for example, a q-phase current command value) and an actual current value (for example, a q-phase actual current value) may be used instead of the current command value.

Moreover, the primary frequency control unit 16 limits the generated primary frequency command value to the maximum primary frequency computed by the maximum primary frequency computing unit 36 to be described later.

The slip frequency computing unit 18 computes a slip frequency estimation value on the basis of the current command value (the torque command value) generated by the speed controller 12. Specifically, the slip frequency computing unit 18 computes an optimum slip frequency of slip-frequency-control-type vector control on the basis of the d-phase current command value and the q-phase current command value to obtain a present slip frequency estimation value. For example, a slip frequency estimation value $\omega_s$ [rad/s] is obtained by the following equation based on a mutual inductance M, a secondary inductance $L_2$, a secondary resistance $R_2$, a secondary d-phase magnetic flux value $\phi_{2d}$, and a primary q-phase current value $i_{1q}$ of the induction motor 3.

$$\omega_s = \frac{MR_2}{L_2} \frac{i_{1q}}{\phi_{2d}}$$

Here, in a normal state, the secondary d-phase magnetic flux value $\phi_{2d}$ is obtained by the following equation based on the mutual inductance M and a primary d-phase current value $i_{1d}$.

$$\phi_{2d} = M i_{1d}$$

From this, the slip frequency estimation value $\omega_s$ in a normal state is obtained by the following equation (1).

$$\omega_s = \frac{R_2}{L_2} \frac{i_{1q}}{i_{1d}} = K \frac{i_{1q}}{i_{1d}} \quad (1)$$

In general, K is called a slip constant.

Various methods are known as a method for calculating the slip frequency estimation value. For example, an actual current value (for example, a q-phase actual current value (FB) and a d-phase actual current value (FB)) may be used instead of the current command value.

The subtractor 20 obtains a rotation speed estimation value of the induction motor 3 by the following equation (2) based on the primary frequency command value obtained by the primary frequency control unit 16 and the slip frequency estimation value obtained by the slip frequency computing unit 18.

(Rotation speed estimation value)=(Primary frequency command value)−(Slip frequency estimation value) (2)

In the present embodiment, the slip frequency computing unit 18 and the subtractor 20 function as the rotation speed estimating unit 30. That is, the rotation speed estimating unit 30 estimates a slip frequency on the basis of the current command value (current information) generated by the speed controller 12 and a slip constant (that is, a motor constant) and estimates the rotation speed of the induction motor 3 on the basis of the slip frequency estimation value and the primary frequency command value generated by the primary frequency control unit 16.

As described above, the rotation speed estimating unit 30 may use an actual current value (current information) instead of the current command value.

The 2-phase-3-phase converting unit 22 converts the d-phase voltage command value and the q-phase voltage command value generated by the current controller 14 to a voltage command value of the respective UVW phases on the basis of the primary frequency command value generated by the primary frequency control unit 16 to thereby generate a voltage command value for driving the induction motor 3.

The proximity switch 31 is provided in the induction motor 3. The proximity switch 31 may be included in the induction motor 3 and may be provided outside the induction motor 3.

The proximity switch 31 is a proximity switch defined by JIS C 8201-5-2 or IEC60947-5-2, for example, and is an inductive proximity switch, a capacitive proximity switch or the like that detects proximity of a metallic and/or nonmetallic object.

The proximity switch 31 outputs an ON signal when a portion of a shaft (a rotating body) of the induction motor 3 is in proximity and outputs an OFF signal when a portion of the shaft of the induction motor 3 is not in proximity.

Figure 2:
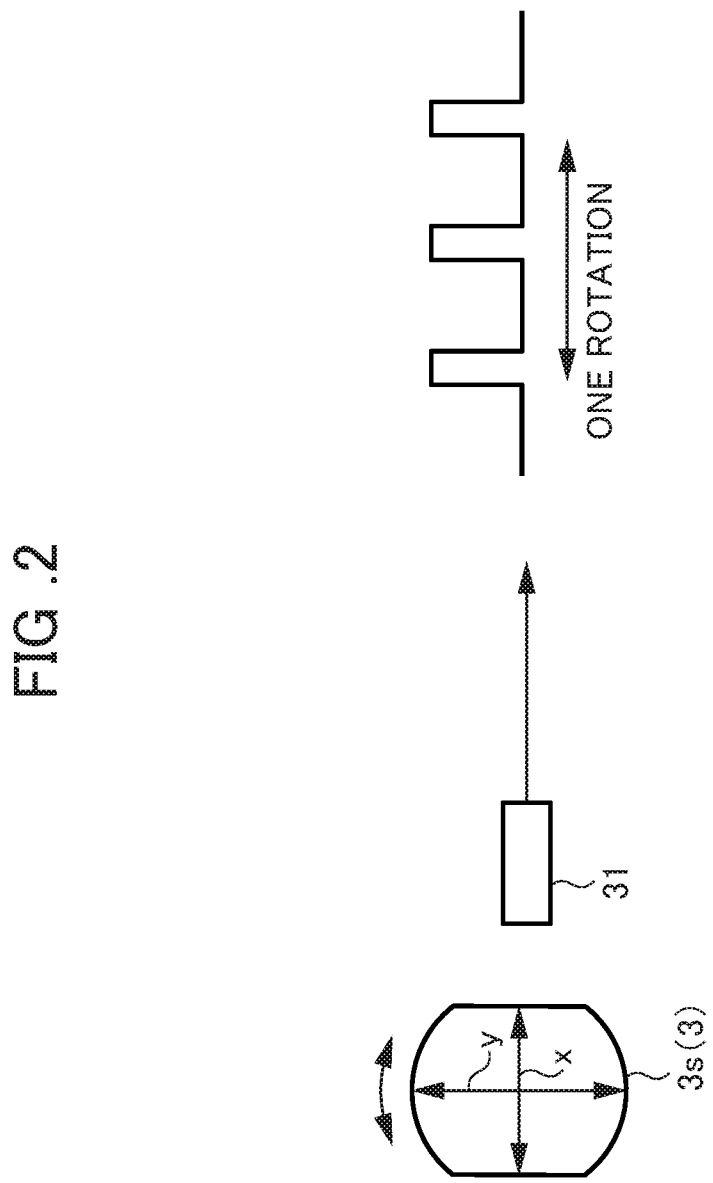
FIG. 2 is a diagram for describing an example of a proximity switch.

For example, as illustrated in FIG. 2, when two orthogonal diameters x and y of a shaft 3s of the induction motor 3 are different, the proximity switch 31 outputs an ON signal (a pulse signal of the HIGH level) when the longer diameter y portion is in proximity and outputs an OFF signal (a signal of the LOW level) when the longer diameter y portion is not in proximity. In the example of FIG. 2, since the longer diameter y portion is in proximity two times when the shaft 3s of the induction motor 3 rotates once, the proximity switch 31 outputs two pulse signals.

The shape of the shaft (rotating body) of the induction motor 3 is not limited to this. A sawtooth shape may be used as the shape of the shaft (rotating body) of the induction motor 3.

The proximity switch 31 is different from a speed sensor such as a rotary encoder used in a speed control system of an induction motor. A difference between a proximity switch and a rotary encoder will be described following.

A rotary encoder outputs A-phase signals and B-phase signals. Due to this, by using the rotary encoder, it is possible to detect a rotating position and a rotating direction in addition to a rotation speed. Moreover, the rotation speed and the rotating position can be detected with high accuracy and at a high speed.

On the other hand, the proximity switch outputs pulses of one phase very smaller than the number of phases of the output pulses of the rotary encoder (typically, pulses of one phase are output once or twice per rotation of the motor). Due to this, by using a proximity switch, it is possible to detect a rotation speed but cannot detect a rotating position and a rotating direction.

Moreover, when a rotation speed is computed from the pulse output of the proximity switch, since the number of pulses is counted at a predetermined sampling period, the counted number is converted to a speed, and the speed is averaged (smoothed), detection of the rotation speed takes a considerable amount of time. Furthermore, the detection resolution of the rotation speed determined by the sampling period and the averaging time is low. Since the rotation speed computed from the output pulses of the proximity switch has low responsiveness and resolution, it is not possible to use the proximity switch in a speed control system unlike a rotary encoder.

In the present embodiment, the rotation speed of the induction motor is detected in the following manner using a proximity switch rather than a speed sensor such as a rotary encoder.

The rotation speed computing unit 32 computes the rotation speed of the induction motor 3 on the basis of the ON signal and the OFF signal output from the proximity switch 31.

For example, the rotation speed computing unit 32 counts the number of pulses of the ON signal output from the proximity switch 31 at a predetermined sampling period, converts the counted number to a speed, and averages (smoothes) the converted speed using a filter to thereby obtain the rotation speed of the induction motor 3.

When the proximity switch 31 outputs n pulse signals when the shaft 3s of the induction motor 3 rotates once, the number of pulses generated in a sampling period Fs is converted to a speed by the following equation.

Speed $(\text{min}^{-1}) = 1/Fs \times 60/n$

The speed computed by this equation is averaged by a filter. Due to this, as described above, the computed speed has a detection delay corresponding to a time constant of the filter.

The delay compensating unit 34 corrects a delay of the rotation speed computation value computed by the rotation speed computing unit 32 with respect to an actual speed (or the rotation speed estimation value estimated by the rotation speed estimating unit 30). Specifically, the delay compensating unit 34 has an inverse function of a transfer function of the filter of the rotation speed computing unit 32. For example, when a transfer function (first-order) of the filter is $1/(\tau s+1)$, the transfer function of the delay compensating unit 34 may be $\tau s+1$ ($\tau$ is a time constant).

The maximum primary frequency computing unit 36 computes a maximum primary frequency by the following equation (3) based on the rotation speed computation value (after delay compensation) corrected by the delay compensating unit 34 and the maximum slip frequency during the maximum output at the rotation speed computation value (after delay compensation) of the induction motor 3.

(Maximum primary frequency)=(Rotation speed computation value (after delay compensation))+(Maximum slip frequency (after delay compensation)) (3)

The maximum slip frequency is obtained on the basis of the maximum current value during the maximum output of the induction motor 3. For example, the maximum slip frequency $\omega_{Smax}$ [rad/s] is obtained by the following equation based on a maximum secondary d-phase magnetic flux value $\phi_{2dmax}$, a maximum primary q-phase current value $i_{1qmax}$, and a maximum primary d-phase current value $i_{1dmax}$.

$$\omega_{s\,max} = \frac{MR_2}{L_2}\frac{i_{1q\,max}}{\phi_{2d\,max}} = \frac{R_2}{L_2}\frac{i_{1q\,max}}{i_{1d\,max}} = K\frac{i_{1q\,max}}{i_{1d\,max}}$$

Figure 3:
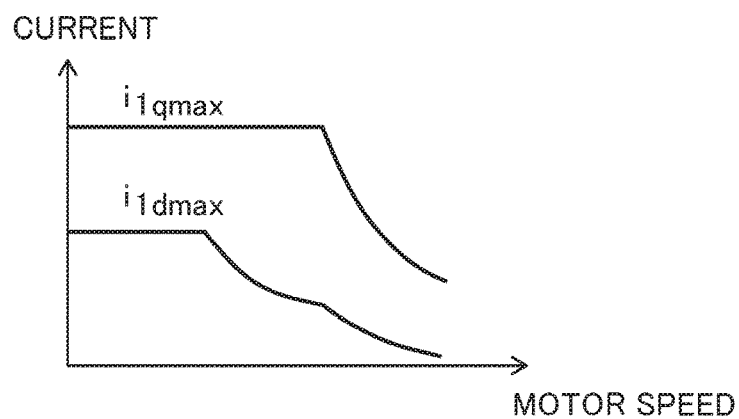
FIG. 3 is a diagram illustrating an example of a relationship between a maximum primary q-phase current and a maximum primary d-phase current and motor speed characteristics during the maximum output of an induction motor.
Figure 4:
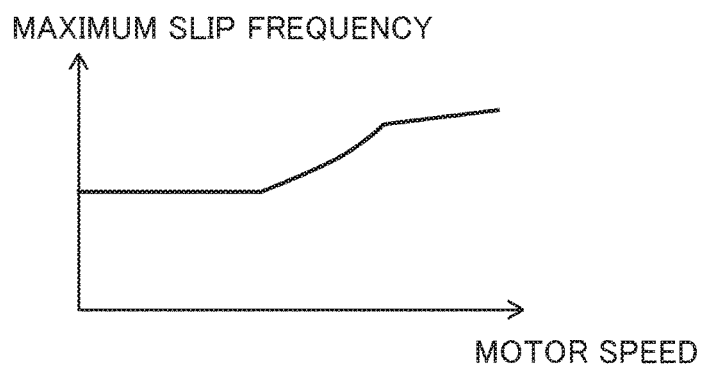
FIG. 4 is a diagram illustrating an example of a relationship between a maximum slip frequency and motor speed characteristics during the maximum output of an induction motor.

For example, as illustrated in FIG. 3, the maximum primary q-phase current value i1qmax and the maximum primary d-phase current value $i_{1dmax}$ have current-motor speed characteristics for each motor. From this, the maximum slip frequency and the motor speed have such a relationship as illustrated in FIG. 4, for example.

The abnormality detection unit 40 detects an abnormality in the rotation speed estimation value or an abnormality in the rotation speed computation value on the basis of the rotation speed estimation value estimated by the rotation speed estimating unit 30 and the rotation speed computation value (after delay compensation) corrected by the delay compensating unit 34. Specifically, the abnormality detection unit 40 detects an abnormality in the rotation speed estimation value or an abnormality in the rotation speed computation value when a state in which a difference between the rotation speed estimation value and the rotation speed computation value is equal to or larger than a threshold continues for a predetermined period or longer.

Examples of the causes of an abnormality in the rotation speed estimation value include an abnormality in the speed control system 10 including the subtractor 11, the speed controller 12, the current controller 14, and the 2-phase-3-phase converting unit 22, the primary frequency control unit 16, the rotation speed estimating unit 30 including the slip frequency computing unit 18 and the subtractor 20, or the like.

On the other hand, examples of the causes of an abnormality in the rotation speed computation value include an abnormality in the proximity switch 31, the rotation speed computing unit 32 or the like.

In this way, the abnormality detection unit 40 can detect an abnormality in the rotation speed estimation value or an abnormality in the proximity switch 31.

The abnormality notification unit 42 notifies the numerical controller (a host controller) 2 of an abnormality in the rotation speed estimation value or an abnormality in the proximity switch 31 when the abnormality detection unit 40 detects an abnormality in the rotation speed estimation value or an abnormality in the proximity switch 31.

For example, the numerical controller 2 stops supplying the speed command according to a notification from the abnormality notification unit 42. In this way, the motor controller 1 stops an abnormal operation.

The storage unit 35 stores a threshold and a predetermined period for detecting an abnormality in the rotation speed estimation value or an abnormality in the proximity switch 31.

Moreover, the storage unit 35 stores various parameters used for computation in the maximum primary frequency computing unit 36 and computation in the slip frequency computing unit 18 (examples of the parameters include the mutual inductance 21, the secondary inductance $L_2$, the secondary resistance $R_2$, the secondary d-phase magnetic flux value $\phi_{2d}$, the primary q-phase current value $i_{1q}$, the primary d-phase current value $i_{1d}$, the maximum secondary d-phase magnetic flux value $\phi_{2dmax}$, the maximum primary q-phase current value $i_{1qmax}$, and the maximum primary d-phase current value $i_{1dmax}$ of the induction motor 3). The storage unit 35 is a rewritable memory such as an EEPROM, for example.

The subtractor 11, the speed controller 12, the current controller 14, the primary frequency control unit 16, the slip frequency computing unit 18, the subtractor 20, the 2-phase-3-phase converting unit 22, the rotation speed estimating unit 30, the rotation speed computing unit 32, the delay compensating unit 34, the maximum primary frequency computing unit 36, the abnormality detection unit 10, and the abnormality notification unit 42 (and a delay unit 37, a state determining unit 38, and a state notification unit 39 to be described later) of the motor controller 1 (and a motor controller 1A to be described later) are configured as an arithmetic processor such as a digital signal processor (DSP) or a field-programmable gate array (FPGA), for example. The respective functions of the motor controller 1 are realized by executing predetermined software (a program, an application) stored in a storage unit, for example. The respective functions of the motor controller 1 may be realized by cooperation of hardware and software and may be realized by hardware (electronic circuits) only.

An operation of the motor controller 1 having the above-described configuration will be described. First, when a speed command value is supplied from the numerical controller 2, the subtractor 11 obtains a speed deviation between the speed command value and the rotation speed estimation value estimated by the rotation speed estimating unit 30, and the speed controller 12 generates a current command value (a torque command value) on the basis of the speed deviation. The current controller 14 generates a d-phase voltage command value and a q-phase voltage command value on the basis of the current command value and the actual current value (a current FB value) of the induction motor 3 detected by a current detector (not illustrated). In this case, the primary frequency control unit 16 generates a primary frequency command value on the basis of the current command value. The 2-phase-3-phase converting unit 22 converts the d-phase voltage command value and the q-phase voltage command value generated by the current controller 14 to a voltage command value of the respective UVW phases on the basis of the primary frequency command value generated by the primary frequency control unit 16 and supplies the voltage command value to the induction motor 3.

In this case, the slip frequency computing unit 18 of the rotation speed estimating unit 30 computes an optimum slip frequency of slip-frequency-control-type vector control on the basis of the d-phase current command value and the q-phase current command value to obtain a present slip frequency estimation value. For example, the slip frequency estimation value $\omega_s$ is obtained by the equation (1). The subtractor 20 obtains a rotation speed estimation value by the equation (2) based on the primary frequency command value and the slip frequency estimation value.

Here, the actual slip frequency may deviate greatly from a slip frequency estimation value (an optimum slip frequency) $\omega_s$ (that is, an ideal value). Due to this, the actual speed may deviate greatly from the rotation speed estimation value.

This is likely to occur in a heavy load state or during acceleration and deceleration particularly. For example, in a heavy load state, although both the actual speed and the rotation speed estimation value decrease in relation to the speed command value, a decrease in the actual speed tends to be larger than a decrease in the rotation speed estimation value, and a deviation occurs between the actual speed and the rotation speed estimation value. In such a case, from the following equation (4), since the actual speed becomes smaller than the rotation speed estimation value, the actual slip frequency becomes larger than the slip frequency estimation value.

(Slip frequency)=(Primary frequency)−(Motor speed) (4)

Figure 5:
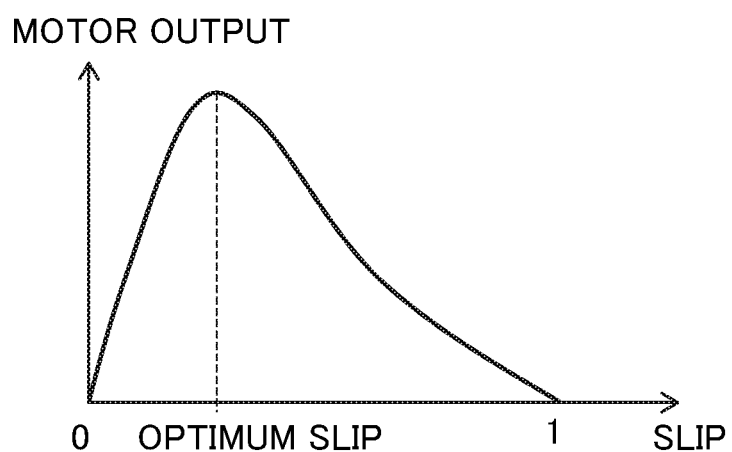
FIG. 5 is a diagram illustrating an example of a relationship between an output of an induction motor and a slip.

FIG. 5 is a diagram illustrating an example of a relationship between the output of the induction motor and a slip. In FIG. 5, a slip is expressed by the following equation.

(Slip)=((Primary frequency)−(Motor speed))/(Primary frequency)=(Slip frequency)/(Primary frequency)

As illustrated in FIG. 5, when an actual slip becomes larger than an optimum slip (that is, when an actual slip frequency becomes larger than an optimum slip frequency), an actual torque decreases and the motor output decreases.

Therefore, in the present embodiment, when the actual speed decreases (the actual speed deviates from the rotation speed estimation value), the primary frequency command value is limited so that the actual slip frequency does not increase too much. More specifically, as the actual speed decreases (the actual speed deviates from the rotation speed estimation value) (that is, the actual slip frequency increases), the primary frequency command value is limited so as to decrease further.

Specifically, the rotation speed computing unit 32 computes and detects a rotation speed of the induction motor 3 on the basis of the ON signal and the OFF signal from the proximity switch 31. Subsequently, the delay compensating unit 34 corrects a delay of the rotation speed computation value computed by the rotation speed computing unit 32 with respect to an actual speed value. Subsequently, the maximum primary frequency computing unit 36 computes a maximum primary frequency by the equation (3) based on the rotation speed computation value (after delay compensation) corrected by the delay compensating unit 34 and the maximum slip frequency during the maximum output of the induction motor 3. Subsequently, when the primary frequency command value generated on the basis of the current command value is larger than the maximum primary frequency computed by the maximum primary frequency computing unit 36, the primary frequency control unit 16 limits the generated primary frequency command value to the maximum primary frequency. On the other hand, when the generated primary frequency command value is equal to or smaller than the maximum primary frequency, the primary frequency control unit 16 does not limit the primary frequency command value but outputs the same as it is.

In this manner, the proximity switch 31 and the rotation speed computing unit 32 detect the actual speed (the rotation speed computation value) of the induction motor 3, and the maximum primary frequency computing unit 36 computes the maximum primary frequency on the basis of the detected actual speed (the rotation speed computation value) of the induction motor 3. In this way, the maximum primary frequency computing unit 36 sets the maximum primary frequency so that the smaller the actual speed (the more the actual speed deviates from the rotation speed estimation value) (that is, the larger the actual slip frequency), the smaller the maximum primary frequency (see the equation (3)).

The primary frequency control unit 16 limits the primary frequency command value generated on the basis of the current command value to the maximum primary frequency. In this way, when the actual speed becomes smaller (that is, when the actual speed deviates from the rotation speed estimation value), the primary frequency command value is limited so that the actual slip frequency does not increase too much (see the equation (4)). More specifically, the primary frequency command value is limited so that the smaller the actual speed (the more the actual speed deviates from the rotation speed estimation value), the smaller the primary frequency command value to thereby suppress an increase in the actual slip frequency further.

In this way, it is possible to suppress a decrease in the motor output resulting from a deviation between the actual slip frequency and the slip frequency estimation value (the optimum slip frequency) (a deviation between the actual speed and the rotation speed estimation value).

However, the rotation speed computation value computed by the rotation speed computing unit 32 has a delay corresponding to the time constant of the filter of the rotation speed computing unit 32 in relation to the actual speed.

In this regard, the delay compensating unit 34 generates a rotation speed computation value (after delay compensation) obtained by correcting a delay of the rotation speed computation value in relation to the actual speed. In this way, the maximum primary frequency computing unit 36 can compute the maximum primary frequency on the basis of the rotation speed computation value (after delay compensation) closer to the actual speed, and the primary frequency control unit 16 can limit the primary frequency command value generated on the basis of the current command value more appropriately to this maximum primary frequency.

As a result, it is possible to further suppress a decrease in the motor output resulting from a deviation between the actual slip frequency and the slip frequency estimation value (the optimum slip frequency) (a deviation between the actual speed and the rotation speed estimation value).

Figure 6:
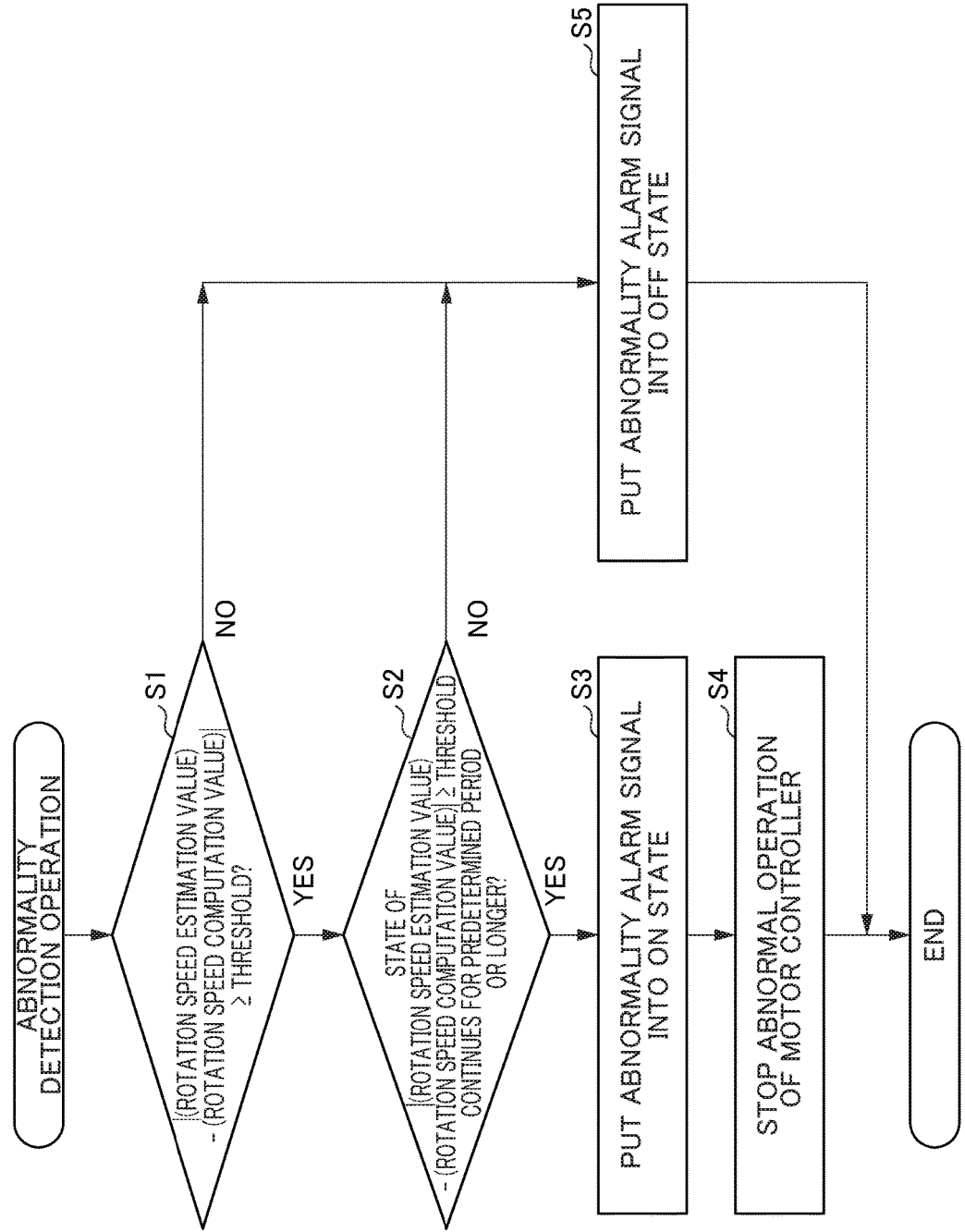
FIG. 6 is a flowchart illustrating an abnormality detection operation of a motor controller according to the present embodiment.

Next, an abnormality detection operation of the motor controller 1 of the present embodiment will be described with reference to FIG. 6. FIG. 6 is a flowchart illustrating an abnormality detection operation of the motor controller 1 of the present embodiment.

In the motor controller 1 that performs speed sensorless control for motors, when a rotation speed estimation value deviates greatly from an actual speed due to limitation of control performance (for example, responsiveness), speed control based on a rotation speed estimation value is not performed properly, and an abnormal operation (for example, an uncontrollable state) may occur.

In this regard, the actual speed is detected using the separate proximity switch 31 and the primary frequency command and/or the slip frequency are corrected. However, when an abnormality occurs in the proximity switch 31, correction of the primary frequency command and/or the slip frequency is not performed properly, and an abnormal operation may occur.

Therefore, in the present embodiment, an abnormality in the rotation speed estimation value or an abnormality in the proximity switch 31 is detected.

Specifically, as illustrated in FIG. 6, the abnormality detection unit 40 determines whether an absolute value of a difference between the rotation speed estimation value estimated by the rotation speed estimating unit 30 and the rotation speed computation value (after delay compensation) corrected by the delay compensating unit 34 is equal to or larger than a threshold (S1).

When it is determined in step S1 that an absolute value of the difference between the rotation speed estimation value and the rotation speed computation value is equal to or larger than the threshold, the abnormality detection unit 40 determines whether a state in which the absolute value of the difference between the rotation speed estimation value and the rotation speed computation value is equal to or larger than the threshold continues for a predetermined period or longer (S2).

When it is determined in step S2 that a state in which the absolute value of the difference between the rotation speed estimation value and the rotation speed computation value is equal to or larger than the threshold continues for the predetermined period or longer, the abnormality detection unit 40 detects that the rotation speed estimation value or the rotation speed computation value is abnormal (that is, an abnormality in the rotation speed estimation value or an abnormality in the proximity switch 31).

In this case, the abnormality notification unit 42 puts an abnormality alarm signal into an ON state to notify the numerical controller 2 of an abnormality in the rotation speed estimation value or an abnormality in the proximity switch 31 (S3).

By doing so, the numerical controller 2 stops supplying the speed command according to the notification from the abnormality notification unit 42. In this way, the motor controller 1 stops an abnormal operation (S4).

On the other hand, when it is determined in step S1 that the absolute value of the difference between the rotation speed estimation value and the rotation speed computation value is smaller than the threshold, or when it is determined in step S2 that the duration of the state in which the absolute value of the difference between the rotation speed estimation value and the rotation speed computation value is equal to or larger than the threshold is smaller than the predetermined period, the abnormality detection unit 40 detects that the rotation speed estimation value and the rotation speed computation value are normal (that is, a normality in the rotation speed estimation value and a normality in the proximity switch 31).

In this case, the abnormality notification unit 42 puts the abnormality alarm signal to an OFF state (S5).

As described above, according to the motor controller 1 of the present embodiment, the abnormality detection unit 40 can detect an abnormality in the rotation speed estimation value or an abnormality in the proximity switch 31 when the difference between the rotation speed estimation value estimated by the rotation speed estimating unit 30 and the rotation speed computation value computed by the rotation speed computing unit 32 is equal to or larger than a reference value.

According to the motor controller 1 of the present embodiment, the abnormality notification unit 42 notifies the numerical controller (the host controller) 2 of the fact that the abnormality detection unit 40 has detected an abnormality in the rotation speed estimation value or an abnormality in the proximity switch 31. In this way, the motor controller 1 can stop an abnormal operation according to a command from the numerical controller 2.

However, as described above, the rotation speed computation value computed by the rotation speed computing unit 32 has a delay corresponding to the time constant of the filter of the rotation speed computing unit 32 in relation to the actual speed (or the rotation speed estimation value estimated by the rotation speed estimating unit 30).

In this regard, the delay compensating unit 34 generates a rotation speed computation value (after delay compensation) obtained by correcting the delay of the rotation speed computation value in relation to the actual speed (or the rotation speed estimation value). In this way, the abnormality detection unit 40 can perform an abnormality detection operation more appropriately on the basis of a difference between the rotation speed estimation value estimated by the rotation speed estimating unit 30 and the rotation speed computation value (after delay compensation) corrected by the delay compensating unit 34 (that is, a difference between the rotation speed estimation value and the rotation speed computation value (after delay compensation) with the same amount of delay.

Second Embodiment

Next, an example in which the abnormality detection unit 40 and the abnormality notification unit 42 are applied to another motor controller will be described.

In a machine tool that performs cutting or the like, a speed attainment state in which a rotation speed of a motor that drives a spindle (a rotating shaft) reaches a speed command value and a speed zero state in which the motor stops (that is, the rotation speed of the motor is zero) are detected. For example, machining of a work starts when the speed attainment state is detected. On the other hand, a door of a work arrangement portion is unlocked when the speed zero state is detected (in order to secure safety).

In a conventional motor controller that performs speed sensorless control, the speed attainment state and the speed zero state are detected on the basis of a rotation speed estimation value. However, in speed sensorless control, the rotation speed estimation value may deviate greatly from an actual speed due to limitation of control performance, and the detection accuracy of the speed attainment state and the speed zero state may decrease.

Therefore, in the motor controller of the second embodiment, the actual speed is detected using a separate proximity switch, and the detection (determination) accuracy of the speed attainment state and the speed zero state is enhanced using the actual speed (the rotation speed computation value) detected by the proximity switch and the rotation speed computing unit as well as the rotation speed estimation value estimated on the basis of the current command value.

Figure 7:
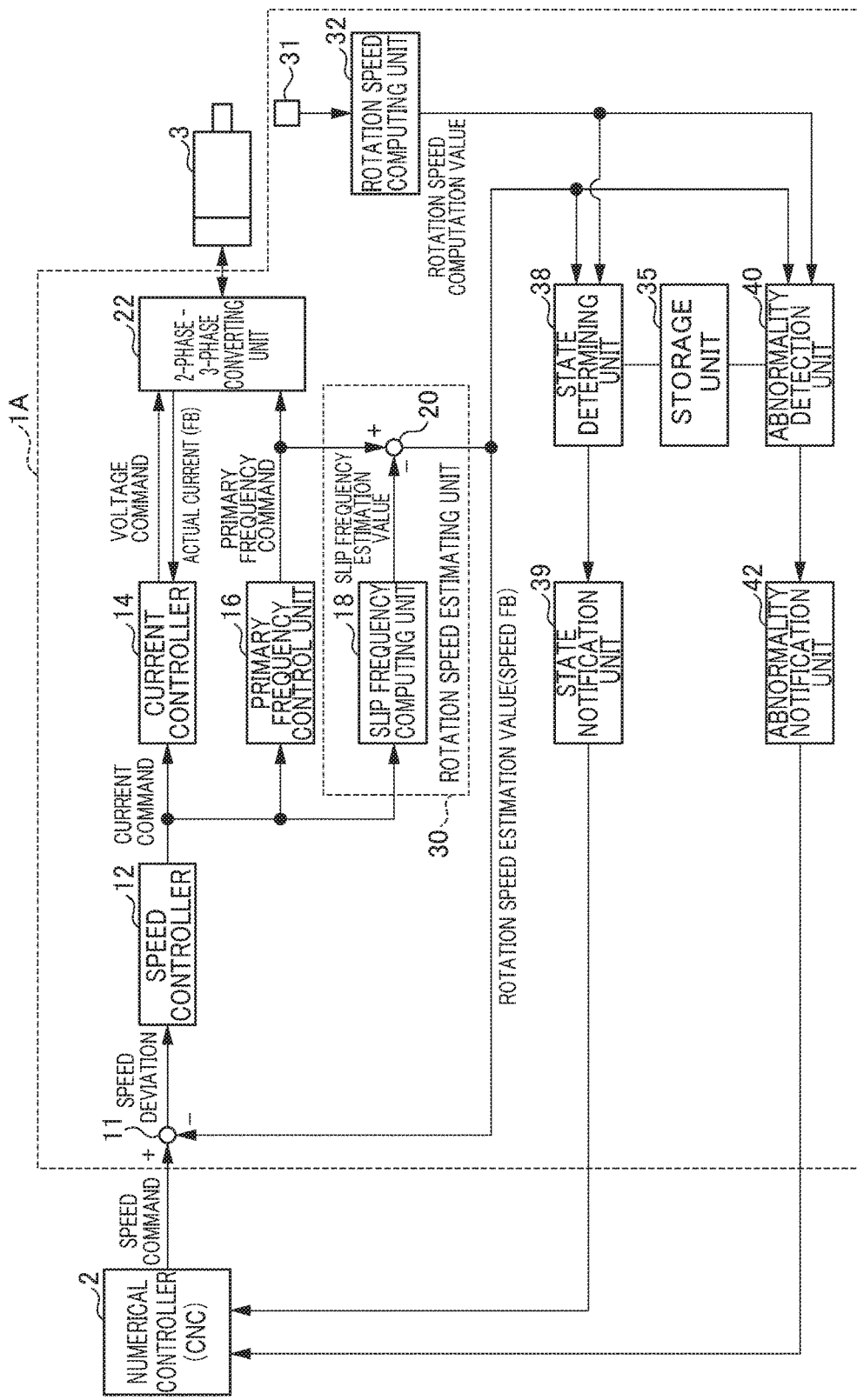
FIG. 7 is a diagram illustrating a configuration of a motor controller according to a second embodiment.

FIG. 7 is a diagram illustrating a configuration of a motor controller according to the second embodiment. The motor controller 1A illustrated in FIG. 7 is different from the motor controller 1 of the first embodiment illustrated in FIG. 1 in that the motor controller 1A includes a state determining unit 38 and a state notification unit 39 instead of the delay compensating unit 34 and the maximum primary frequency computing unit 36.

The state determining unit 38 determines whether the present state is a speed attainment state in which the rotation speed of the motor 3 reaches a speed command value and whether the present state is a speed zero state (a motor stopping state) in which the rotation speed of the motor 3 is zero on the basis of the rotation speed estimation value estimated by the rotation speed estimating unit 30 and the rotation speed computation value computed by the rotation speed computing unit 32.

Specifically, when both the rotation speed estimation value and the rotation speed computation value are equal to or smaller than a first reference value stored in the storage unit 35, the state determining unit 38 determines that the present state is a speed zero state and detects a speed zero state.

Moreover, when both the rotation speed estimation value and the rotation speed computation value are within a reference range which is stored in the storage unit 35 and includes the speed command value, the state determining unit 38 determines that the present state is a speed attainment state and detects a speed attainment state. More specifically, when both an absolute value of a speed deviation between the speed command value and the rotation speed estimation value and an absolute value of a speed deviation between the speed command value and the rotation speed computation value are equal to or smaller than a second reference value (a value half the width of the reference range) stored in the storage unit 35, the state determining unit 38 determines that the present state is a speed attainment state and detects a speed attainment state.

The storage unit 35 stores the first reference value for determining the speed zero state and a reference range (the second reference value) for determining the speed attainment state.

When the state determining unit 38 determines that the present state is a speed attainment state and detects the speed attainment state, the state notification unit 39 notifies a speed attainment state detection signal indicating that the speed attainment state has been detected to the numerical controller (a host controller) 2.

Moreover, when the state determining unit 38 determines that the present state is a speed zero state and detects the speed zero state, the state notification unit 39 notifies a speed zero state detection signal indicating that the speed zero state has been detected to the numerical controller (the host controller) 2.

Figure 8:
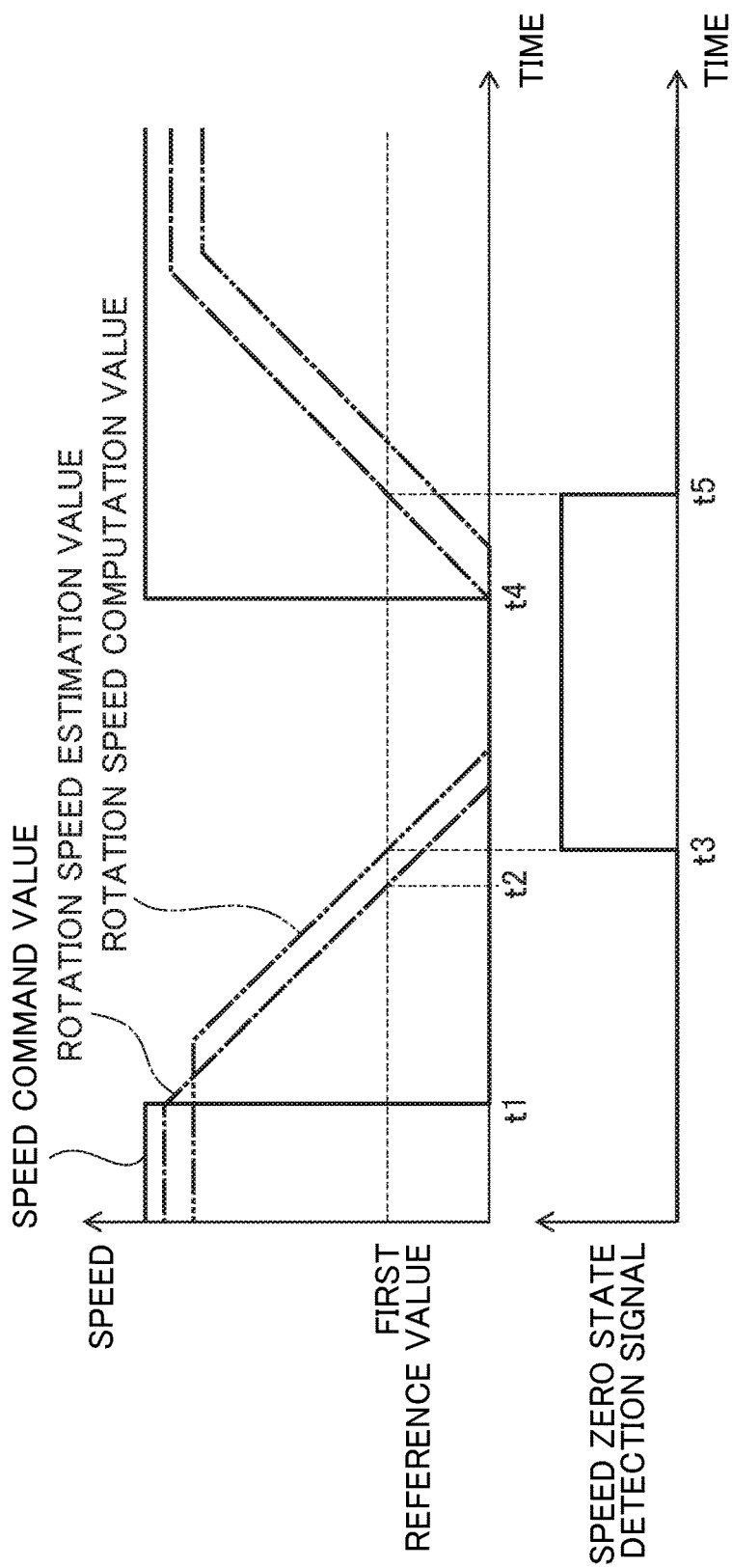
FIG. 8 is a diagram illustrating the waveforms of respective units of the motor controller according to the second embodiment.

A speed zero state detection operation of the motor controller 1A having the above-described configuration will be described with reference to FIG. 8. FIG. 8 is a diagram illustrating the waveforms of respective units of the motor controller 1A of the second embodiment.

In FIG. 8, a solid line indicates a speed command value, a one-dot-chain line indicates a rotation speed estimated by the rotation speed estimating unit 30, and a two-dot-chain line indicates a rotation speed computed by the rotation speed computing unit 32. FIG. 8 also illustrates a speed zero state detection signal.

At time t1, when the speed command value reaches zero, the rotation speed estimation value decreases and the rotation speed computation value decreases with a delay corresponding to the time constant of the filter of the rotation speed computing unit 32. In this case, the speed zero state detection signal is in the OFF state.

At time t2, although the rotation speed estimation value is equal to or smaller than the first reference value, since the rotation speed computation value is larger than the first reference value, the speed zero state detection signal is in the OFF state.

At time t3, when the rotation speed computation value becomes equal to or smaller than the first reference value (that is, when both the rotation speed estimation value and the rotation speed computation value are equal to or smaller than the first reference value), the speed zero state detection signal is in the ON state and the numerical controller 2 is notified of the speed zero state.

After that, at time t4, when the speed command value is supplied, the rotation speed estimation value increases and the rotation speed computation value increases with a delay corresponding to the time constant of the filter of the rotation speed computing unit 32. In this case, the speed zero state detection signal remains in the ON state.

At time t5, when the rotation speed estimation value becomes larger than the first reference value, even when the rotation speed computation value is equal to or smaller than the first reference value, the speed zero state detection signal is in the OFF state and notification of the speed zero state is stopped. That is, in the present embodiment, when either the rotation speed estimation value or the rotation speed computation value becomes larger than the first reference value, notification of the speed zero state is stopped.

When both the rotation speed estimation value and the rotation speed computation value are larger than the first reference value, notification of the speed zero state may be stopped.

Figure 9:
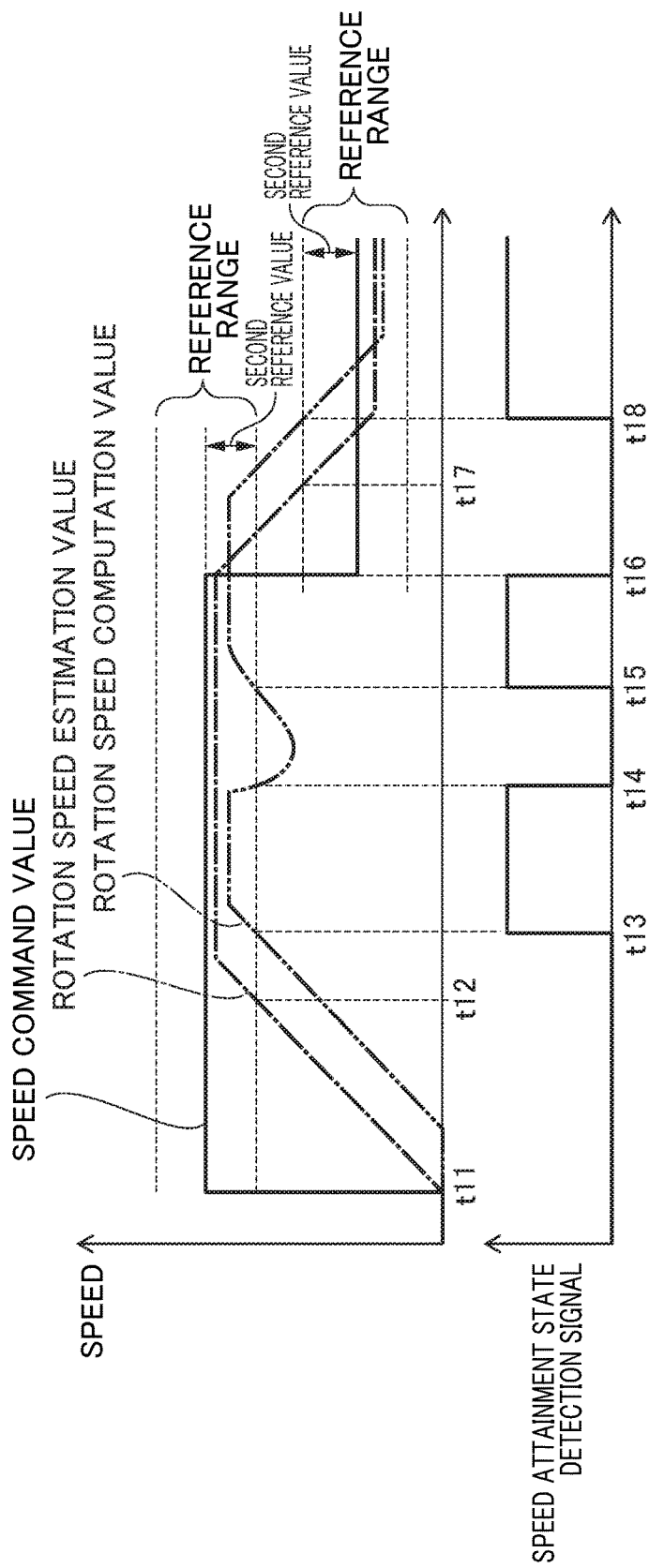
FIG. 9 is a diagram illustrating the waveforms of respective units of the motor controller according to the second embodiment.

Next, a speed attainment state detection operation of the motor controller 1A of the second embodiment will be described with reference to FIG. 9. FIG. 9 is a diagram illustrating the waveforms of respective units of the motor controller 1A of the present embodiment.

In FIG. 9, a solid line indicates a speed command value, a one-dot-chain line indicates a rotation speed estimated by the rotation speed estimating unit 30, and a two-dot-chain line indicates a rotation speed computed by the rotation speed computing unit 32. FIG. 9 also illustrates a speed attainment state detection signal.

A time t11, when the speed command value is supplied, the rotation speed estimation value increases and the rotation speed computation value increases with a delay corresponding to the time constant of the filter of the rotation speed computing unit 32. In this case, the speed attainment state detection signal is in the OFF state.

At time t12, although the rotation speed estimation value is within the reference range, since the rotation speed computation value is not within the reference range, the speed attainment state detection signal remains in the OFF state.

At time t13, when the rotation speed computation value is within the reference range (that is, when both the rotation speed estimation value and the rotation speed computation value are within the reference range), the speed attainment state detection signal is in the ON state and the numerical controller 2 notified of the speed attainment state.

After that, in a period between time points t14 and t15, when the rotation speed computation value only decreases and deviates from the reference range due to disturbance or the like, for example, the speed attainment state detection signal is in the OFF state. That is, in the present embodiment, when either the rotation speed estimation value or the rotation speed computation value is not in the reference range, notification of the speed attainment state is stopped.

When both the rotation speed estimation value and the rotation speed computation value are not within the reference range, notification of the speed attainment state may be stopped.

Moreover, when the speed command value changes (decreases) at time t16, since both the rotation speed estimation value and the rotation speed computation value deviate from the reference range, the speed attainment state detection signal is in the OFF state.

After that, at time t17, although the rotation speed estimation value is within the reference range, since the rotation speed computation value is not within the reference range, the speed attainment state detection signal remains in the OFF state.

At time t18, when the rotation speed computation value is also within the reference range (that is, both the rotation speed estimation value and the rotation speed computation value are within the reference range), the speed attainment state detection signal is in the ON state and the numerical controller 2 is notified of the speed attainment state.

According to the motor controller 1A, by using the rotation speed computation value computed on the basis of the ON/OFF state of the proximity switch 31 in addition to the rotation speed estimation value estimated on the basis of the current command value, it is possible to enhance the detection (determination) accuracy of the speed attainment state and the speed zero state.

According to the motor controller 1A, the state notification unit 39 notifies the numerical controller (the host controller) 2 of the speed attainment state or the speed zero state when the state determining unit 38 determines that the present state is the speed attainment state or the speed zero state. In this way, the numerical controller (the host controller) 2 can recognize the speed attainment state and the speed zero state of the spindle (the rotating shaft) of a machine tool with high accuracy.

However, in the motor controller 1A, when a rotation speed estimation value deviates greatly from an actual speed due to limitation of control performance (for example, responsiveness), speed control based on a rotation speed estimation value is not performed properly, and an abnormal operation (for example, an uncontrollable state) may occur.

Moreover, when an abnormality occurs in the rotation speed estimation value, detection of the speed attainment state and the speed zero state is not performed properly, and an abnormal operation may occur.

Moreover, when an abnormality occurs in the proximity switch 31, detection of the speed attainment state and the speed zero state is not performed properly, and an abnormal operation may occur.

In this regard, in the motor controller 1A of the present embodiment, the abnormality detection unit 40 can detect an abnormality in the rotation speed estimation value or an abnormality in the proximity switch 31 when the difference between the rotation speed estimation value estimated by the rotation speed estimating unit 30 and the rotation speed computation value computed by the rotation speed computing unit 32 is equal to or larger than a threshold.

Moreover, in the motor controller 1A of the present embodiment, the abnormality notification unit 42 notifies the numerical controller (the host controller) 2 of the fact that the abnormality detection unit 40 has detected an abnormality in the rotation speed estimation value or an abnormality in the proximity switch 31. In this way, the motor controller 1A can stop an abnormal operation according to a command from the numerical controller 2.

Modification of Second Embodiment

Figure 10:
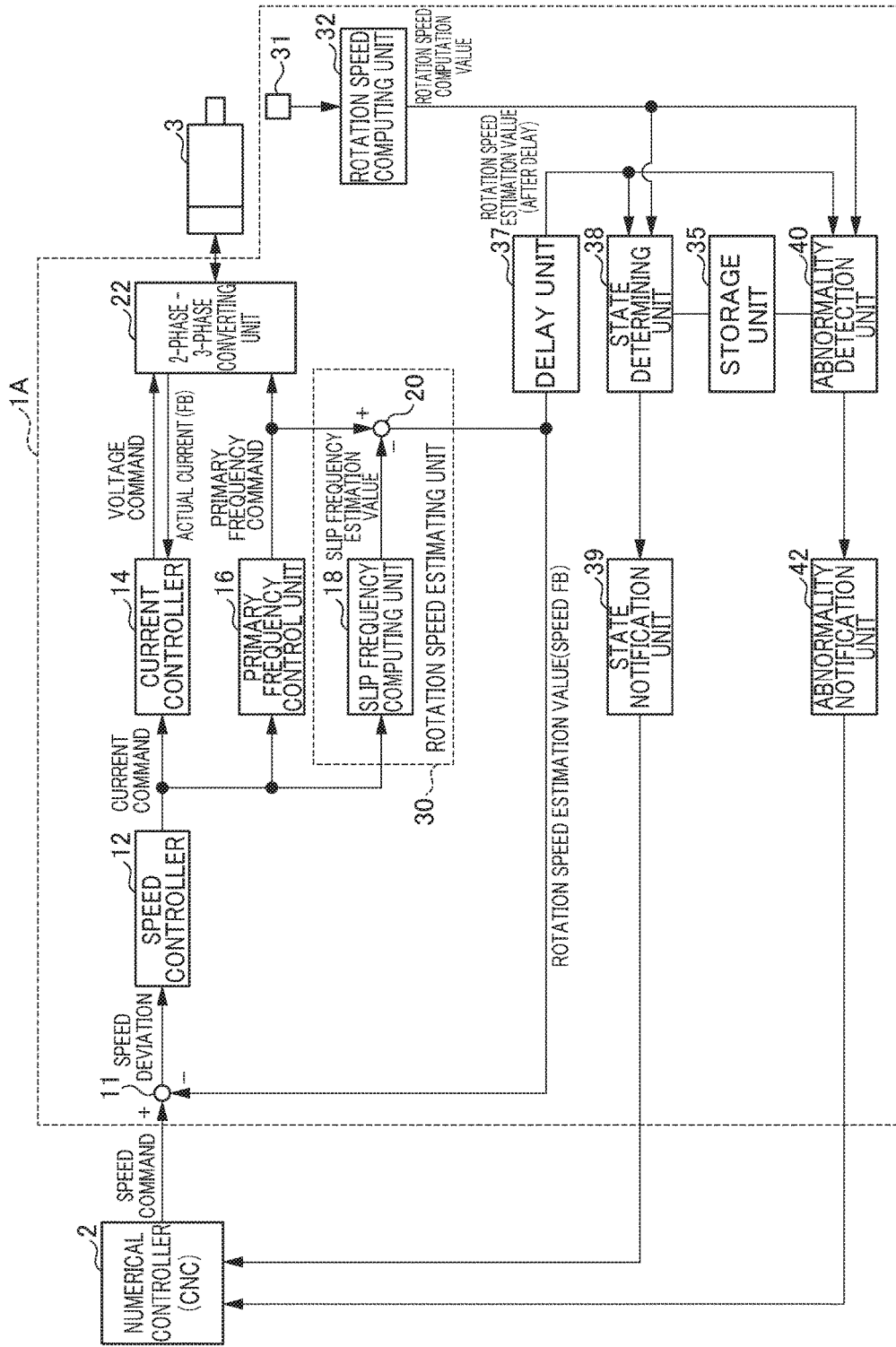
FIG. 10 is a diagram illustrating a configuration of a motor controller according to a modification of the second embodiment.

FIG. 10 is a diagram illustrating a configuration of a motor controller according to a modification of the second embodiment. The motor controller 1A illustrated in FIG. 10 is different from the motor controller 1A of the second embodiment illustrated in FIG. 7 in that the motor controller 1A further includes a delay unit 37.

However, as described above, the rotation speed computation value computed by the rotation speed computing unit 32 has a delay corresponding to the time constant of the filter of the rotation speed computing unit 32 in relation to the actual speed (or the rotation speed estimation value estimated by the rotation speed estimating unit 30).

Therefore, the delay unit 37 delays the rotation speed estimation value estimated by the rotation speed estimating unit 30 by the delay of the filter of the rotation speed computing unit 32. Specifically, the delay unit 37 has the same filter as the filter of the rotation speed computing unit 32. For example, when the transfer function (first order) of the filter is $1/(\tau s+1)$, the transfer function of the delay unit 37 may be $1/(\tau s+1)$ ($\tau$ is a time constant).

In this way, the delay unit 37 generates a rotation speed estimation value (after delay) obtained by delaying the rotation speed estimation value by a delay of the rotation speed computation value with respect to the actual speed (or the rotation speed estimation value). In this way, the abnormality detection unit 40 can perform an abnormality detection more appropriately on the basis of a difference between the rotation speed estimation value (after delay) delayed by the delay unit 37 and the rotation speed computation value computed by the rotation speed computing unit 32, that is, a difference between the rotation speed estimation value (after delay) and the rotation speed computation value with the same amount of delay.

While an embodiment of the present invention has been described, the present invention is not limited to the above-described embodiment. The advantages described in the present embodiment are examples of the most preferable advantages obtained from the present invention, and the advantages of the present invention are not limited to those described in the present embodiment.

For example, in the above-described embodiment, although a motor controller that controls an induction motor has been illustrated, the feature of the present invention is not limited to this but can be applied to a motor controller that controls various motors. For example, the feature of the present invention can be also applied to a motor controller that performs speed sensorless control on a so-called speed sensorless synchronous motor that does not have a speed sensor such as a resolver. Since a difference in an actual speed and a rotation speed estimation value in speed sensorless control of an induction motor is larger than a difference between an actual speed and a rotation speed estimation value in speed sensorless control of a synchronous motor, the feature of the present invention is ideally applied to a motor controller that performs speed sensorless control on an induction motor.

Moreover, in the above-described embodiment, although the rotation speed computing unit 32 obtains the rotation speed computation value by averaging the speed converted from the number of pulses of the ON signal output from the proximity switch 31 using a filter, the present invention is not limited thereto. For example, the rotation speed computing unit 32 may obtain the rotation speed computation value by averaging the speed converted from the number of pulses of the ON signal output from the proximity switch 31 in a predetermined period without using the filter. In this case, the delay compensating unit 34 illustrated in FIG. 1 may correct the rotation speed computation value so as to advance (progress) by a predetermined period for averaging of the rotation speed computing unit 32. Moreover, the delay unit 37 illustrated in FIG. 10 may delay the rotation speed estimation value by a predetermined period for averaging of the rotation speed computing unit 32 (see FIG. 10).

In the above-described first embodiment, the motor controller 1 may not necessarily include the delay compensating unit 34. When the delay compensating unit 34 is not included, the maximum primary frequency computing unit 36 may compute the maximum primary frequency by the following equation based on the rotation speed computation value itself computed by the rotation speed computing unit 32 and the maximum slip frequency at the maximum output at the rotation speed computation value of the induction motor 3 rather than the equation (3).

(Maximum primary frequency)=(Rotation speed computation value)+(Maximum slip frequency)

In the above-described first embodiment, the motor controller 1 illustrated in FIG. 1 may include the delay unit 37 illustrated in FIG. 10 instead of the delay compensating unit 34. In the modification of the above-described second embodiment, the motor controller 1A illustrated in FIG. 10 may include the delay compensating unit 34 illustrated in FIG. 1 instead of the delay unit 37.

EXPLANATION OF REFERENCE NUMERALS

1: Motor controller
2: Numerical controller (CNC)
3: Induction motor
3s: Shaft (Rotating body)
10: Speed control system
11, 20: Subtractor
12: Speed controller
14: Current controller
16: Primary frequency control unit
18: Slip frequency computing unit
22: 2-phase-3-phase converting unit
30: Rotation speed estimating unit
31: Proximity switch
32: Rotation speed computing unit
34: Delay compensating unit
35: Storage unit
36: Maximum primary frequency computing unit
37: Delay unit
38: State determining unit
39: State notification unit
40: Abnormality detection unit
42: Abnormality notification unit

What is claimed is:

1. A motor controller that performs speed sensorless control for a motor, comprising:
a rotation speed estimating unit that estimates a rotation speed of the motor on the basis of current information and primary frequency information of the motor;
a proximity switch that outputs an ON signal when a portion of a rotating body of the motor is in proximity and outputs an OFF signal when a portion of the rotating body of the motor is not in proximity;
a rotation speed computing unit that computes a rotation speed of the motor on the basis of the ON signal and the OFF signal output from the proximity switch; and
an abnormality detection unit that detects an abnormality is a rotation speed estimation value or as abnormality in the proximity switch when a difference between the rotation speed estimation value estimated by the rotation speed estimating unit and a rotation speed computation value computed by the rotation speed computing unit is equal to or larger than a threshold.

2. The motor controller according to claim 1, wherein the abnormality detection unit detects an abnormality in the rotation speed estimation value or an abnormality of the proximity switch when a state in which the difference between the rotation speed estimation value estimated by the rotation speed estimating unit and the rotation speed computation value computed by the rotation speed computing unit is equal to or larger than the threshold continues for a predetermined period or longer.

3. The motor controller according to claim 1, further comprising: a delay compensating unit that corrects a delay of the rotation speed computation value computed by the rotation speed computing unit with respect to an actual speed or the rotation speed estimation value estimated by the rotation speed estimating unit, wherein
the abnormality detection unit detects an abnormality in the rotation speed estimation value or an abnormality in the proximity switch when a difference between the rotation speed estimation value estimated by the rotation speed estimating unit and the rotation speed computation value corrected by the delay compensating unit is equal to or larger than a threshold.

4. The motor controller according to claim 3, wherein the rotation speed computing unit counts the number of pulses of the ON signal output from the proximity switch at a predetermined sampling period, converts the counted number of pulses to a speed, and averages the converted speed using a filter to obtain the rotation speed computation value, and
the delay compensating unit has an inverse function of a transfer function of the filter of the rotation speed computing unit.

5. The motor controller according to claim 1, further comprising: a delay unit that delays the rotation speed estimation value estimated by the rotation speed estimating unit by a delay of the rotation speed computation value computed by the rotation speed computing unit with respect to the actual speed or the rotation speed estimation value estimated by the rotation speed estimating unit, wherein
   the abnormality detection unit detects an abnormality in the rotation speed estimation value or an abnormality in the proximity switch when a difference between the rotation speed estimation value delayed by the delay unit and the rotation speed computation value computed by the rotation speed computing unit is equal to or larger than a threshold.

6. The motor controller according to claim 5, wherein the rotation speed computing unit counts the number of pulses of the ON signal output from the proximity switch at a predetermined sampling period, converts the counted number to a speed, and averages the converted speed using a filter to thereby obtain the rotation speed computation value, and
   the delay unit has the same filter as the filter of the rotation speed computing unit.

7. The motor controller according to claim 1, further comprising: an abnormality notification unit that notifies a host controller of a fact that the abnormality detection unit has detected an abnormality in the rotation speed estimation value or an abnormality in the proximity switch.

* * * * *